(No Model.)
Z. C. WARREN.
PREPARATION OF MINERAL FILLING FOR PAPER MAKERS' USE.
No. 318,063. Patented May 19, 1885.
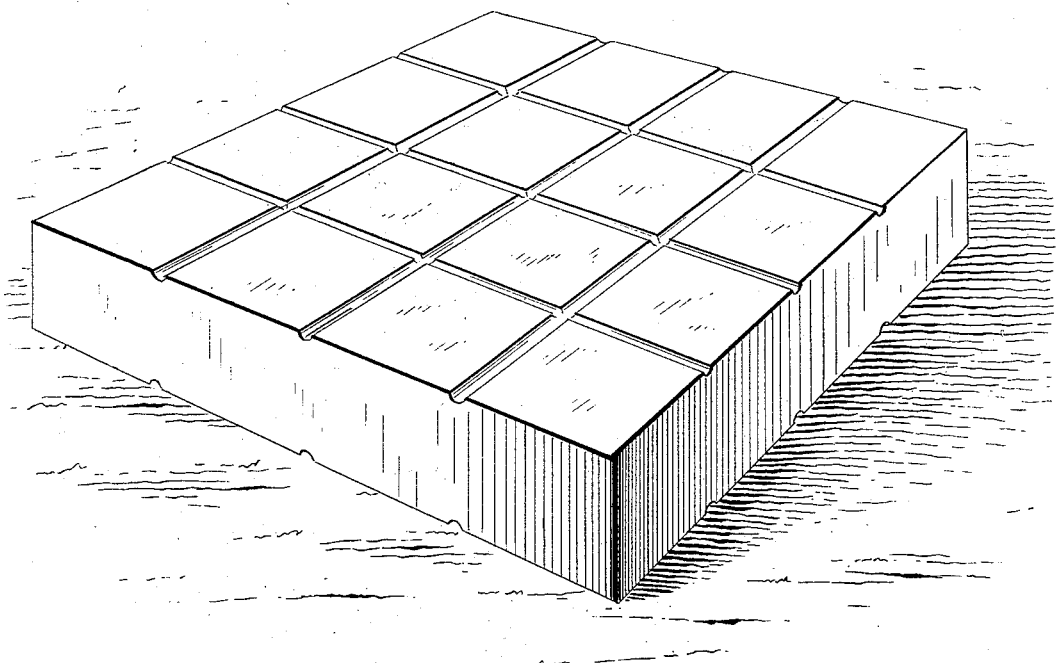
WITNESSES:
INVENTOR
BY
ATTORNEY

UNITED STATES PATENT OFFICE.

ZENAS C. WARREN, OF SPRINGFIELD, MASSACHUSETTS.

PREPARATION OF MINERAL FILLING FOR PAPER-MAKERS' USE.

SPECIFICATION forming part of Letters Patent No. 318,063, dated May 19, 1885.

Application filed April 20, 1885. (No specimens.)

*To all whom it may concern:*

Be it known that I, ZENAS C. WARREN, a citizen of the United States, residing at Springfield, in the county of Hampden and State of Massachusetts, have invented new and useful Improvements in Preparation of Mineral Filling for Paper-Makers' Use, of which the following is a specification.

This invention relates to the manner of preparing mineral filling for paper-makers' use, the object being to provide said filling in an improved condition for its introduction into the beating-engines with the paper-stock, and for its transportation and handling, whereby the inconveniences and uneven mixing of said filling with said stock, resulting from the use of prepared gypsum and similar substances in a dry and in a semi-fluid state, are obviated, and the greater part of the expense of transportation in the latter condition is saved, and the quality of the paper is improved.

In the drawings forming part of this specification is illustrated a block of mineral filling prepared according to my invention.

It has been the practice heretofore, where the mineral filling has been shipped to the mills in a dry condition, to introduce it into the beating-engines to be mixed with the stock therein in the form of a dry impalpable white powder, which, when properly mixed with the paper-stock in the beating-engine of a paper-mill, produces a quality of paper capable of receiving a firm and highly-polished surface-finish; but in using said powder in a dry state it occasions much inconvenience in the mill by reason of its lightness and consequent tendency to permeate the air of the room where it is handled, and a more serious trouble still arises from its use in said dry state—namely, the great difficulty of evenly mixing such a dry element with water and ground stock in the engine, as it is liable to separate into separate bubbles, balls, or groups, acting as any dry powder naturally does when put into water. Thus the powder does not become evenly amalgamated with the stock, and consequently a mottled or spotted appearance is given to the surface of the finished paper.

The above inconveniences have been sought to be overcome by mixing the powder at the place of its manufacture with a sufficient quantity of water to give a fluid condition to the whole mass, and shipping it in barrels to the paper-mills; but this was found to entail too much expense in proportion to the actual amount of the powder handled.

My invention, as hereinafter set forth, obviates the above inconveniences, and is carried out as follows: I prepare the calcined gypsum by agitating the same with water until it has lost entirely its setting or hardening quality or tendency, and then it is pumped into a suitable press, similar to those used in the manufacture of linseed-oil, &c., having cells therein adapted to receive a certain quantity of the mixed powder and water, and to give to the same, after requisite pressure, the form of a block, preferably of a rectangular shape, and substantially as represented in the drawings, having found that a convenient size for such blocks to permit of easy handling is about eighteen inches square by four inches thick. Said powder-mixture in the press is submitted to sufficient pressure to cause all but about twenty-five to forty per cent. of the water contained therein to be expressed therefrom, thereby leaving the block sufficiently rigid to bear handling and transportation, but containing enough water to cause the mineral powder to perfectly mix and amalgamate with the paper-stock in the engine, said blocks being deposited in the engine whole, one or more at a time, as may be wanted. I have further discovered that by submitting said filling material to pressure in a wet state, as aforesaid, the fluid that runs off under pressure carries with it any soluble impurities contained in the powder, including more or less natural acid, which results from the presence often of more or less sulphur in the gypsum from which the mineral filling is derived, thus leaving the pressed material in practically a neutral state, which is greatly to be desired.

What I claim as my invention is—

The method of preparing mineral filling for use in paper-stock, which consists in forming from a semi-fluid mass of said filling and water blocks of the same by pressure, of sufficient hardness to permit of handling, but retaining sufficient water to cause said filling to readily mix with paper-stock, substantially as set forth.

Z. C. WARREN.

Witnesses:
WM. H. CHAPIN,
J. D. GARFIELD.